(12) United States Patent
Muzik et al.

(10) Patent No.: US 11,468,081 B2
(45) Date of Patent: Oct. 11, 2022

(54) SYSTEM AND METHOD FOR ENHANCED TRANSACTION UTILITY

(71) Applicant: JPMorgan Chase Bank, N.A., New York, NY (US)

(72) Inventors: Kristin Muzik, Kennett Square, PA (US); Murali Pingali, New Albany, OH (US); Lance M. Harris, Wenonah, NJ (US); Shalini Khanna, Hockessin, DE (US); Sang Eun Kim, Brooklyn, NY (US); Amit Kumar Meshram, Romansville, PA (US); Maxwell Evers, Wilmington, DE (US); Ben Ferenchak, Newark, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 98 days.

(21) Appl. No.: 17/154,522

(22) Filed: Jan. 21, 2021

(65) Prior Publication Data
US 2022/0229833 A1    Jul. 21, 2022

(51) Int. Cl.
*G06F 16/248*    (2019.01)
(52) U.S. Cl.
CPC .................. *G06F 16/248* (2019.01)
(58) Field of Classification Search
CPC ..................................................... G06F 16/248
USPC ....................................................... 707/722
See application file for complete search history.

(56) References Cited

U.S. PATENT DOCUMENTS

| | | | | |
|---|---|---|---|---|
| 2002/0184170 A1* | 12/2002 | Gilbert | ................. | G06F 16/958 707/E17.116 |
| 2015/0193872 A1* | 7/2015 | Ivanoff | .................. | G16H 40/20 705/38 |
| 2017/0200222 A1* | 7/2017 | Barber | ................. | G06Q 40/025 |
| 2017/0212731 A1* | 7/2017 | Beck | .................. | G06F 9/44536 |
| 2019/0012316 A1* | 1/2019 | Bahrie | .................... | G06F 16/26 |
| 2021/0117425 A1* | 4/2021 | Rao | ........................... | G06F 8/61 |

* cited by examiner

*Primary Examiner* — Dung K Chau
(74) *Attorney, Agent, or Firm* — Greenblum & Bernstein, P.L.C.

(57) ABSTRACT

Various methods, apparatuses/systems, and media for enhanced transaction utility are disclosed. A processor implements a single data source for accessing to transaction data associated with each type of transaction related to a user account; causes a receiver to receive user input data from a user computing device for requesting access to a type of transaction data related to the user account from the single data source; and authenticate the user based on verifying the received user input data with pre-stored user data. The processor also routes, in response to authenticating, to a transaction application programming interface (API) corresponding to the requested type of transaction data; calls the transaction API via an API gateway to fetch the requested type of transaction data from the single data source; and causes a GUI of the user computing device to display the requested type of transaction data.

20 Claims, 12 Drawing Sheets

SYSTEM AND METHOD FOR ENHANCED TRANSACTION UTILITY

TECHNICAL FIELD

This disclosure generally relates to data processing, and, more particularly, to methods and apparatuses for implementing an enhanced transaction utility module that provides one platform for all transaction related informational data, thereby isolating the complexity of fetching transaction data from different sources and ensuring that transaction data are fetched by client applications in a secure, performant, and resilient way.

BACKGROUND

Today's client applications in large enterprises, corporations, agencies, institutions, and other organizations are facing a continuing problem of lacking the capabilities in allowing their clients to access or fetch transaction related data in a quick, expedited, and accurate manner. In general, disparate systems across an organization may hold transaction data. For example, there may be various different databases/systems for credit card transactions, debit card transactions, etc. Additionally, for each type of transaction, there may be different systems that may hold the informational data depending on criteria such as whether the transaction is fully approved or not. This makes sourcing transaction data extremely difficult for client applications.

SUMMARY

The present disclosure, through one or more of its various aspects, embodiments, and/or specific features or sub-components, provides, among other features, various systems, servers, devices, methods, media, programs, and platforms for implementing an enhanced transaction utility module that provides one platform (e.g., a single point or a single source) for all transaction related informational data, thereby isolating the complexity of fetching transaction data from different sources and ensuring that transaction data are fetched by client applications in a secure, performant, and resilient way, but the disclosure is not limited thereto.

According to an aspect of the present disclosure, a method for enhanced transaction utility by utilizing one or more processors and one or more memories is disclosed. The method may include: implementing a single data source for accessing to transaction data associated with each type of transaction related to a user account, receiving user input data from a user computing device for requesting access to a type of transaction data related to the user account; authenticating the user (i.e., a customer, customer account, etc.) based on verifying the received user input data with pre-stored user data; routing, in response to authenticating, to a transaction application programming interface (API) corresponding to the requested type of transaction data; calling the transaction API via an API gateway to fetch (e.g., by utilizing a system, or a customer computing device, or a customer service representative computing device, etc.) the requested type of transaction data from the single data source; and causing a graphical user interface (GUI) of the user computing device to display the requested type of transaction data.

According to a further aspect of the present disclosure, the method may further include: sharing the transaction API between the single data source and a system of record that stores transaction history data associated with each type of transaction related to the user account, wherein the single data source may be responsible for fulfilling "get" requests, and wherein the system of record may be responsible for fulfilling "post", or "put," or "patch," or "delete" requests, but the disclosure is not limited thereto.

According to yet another aspect of the present disclosure, wherein the single data source may be a system of record for transaction level data for assisted and unassisted servicing ensuring that the user gets a consistent view of the transaction data from a single source, but the disclosure is not limited thereto.

According to another aspect of the present disclosure, wherein the single data source may be configured to make the transaction data available for read access via a set of small, independently versioned, and scalable services with specific business goals, but the disclosure is not limited thereto.

According to an additional aspect of the present disclosure, wherein the single data source may be configured to store a complete set of commonly used fields for each type of transaction, transaction data enrichment, and supplementary data, but the disclosure is not limited thereto.

According to a further aspect of the present disclosure, wherein the transaction data enrichment may include one or more of the following data: cleansed counterparty name data, cleansed category data, deduced recurring indicator data, and card on file indicator data, but the disclosure is not limited thereto.

According to yet another aspect of the present disclosure, wherein the supplementary data may include one or more of the following data to identify a transaction: automated clearing house (ACH) payee information data and real-time payment (RTP) payee information data, but the disclosure is not limited thereto.

According to another aspect of the present disclosure, the method may further include: filtering the transaction data based on one or more of the following type of data: date range data, merchant data, payee data, category data, and amount data, but the disclosure is not limited thereto; and displaying the filtered transaction data in response to received user input data associated with type of data requested.

According to an additional aspect of the present disclosure, wherein, when accessing the single data source, if no response is received within a predetermined time period, the method may further include: automatically requesting again to fetch the transaction data from other system of record that stores the transaction data.

According to a further aspect of the present disclosure, a system for enhanced transaction utility is disclosed. The system may include a processor and one or memories operatively connected to the processor via a communication network. The processor may be configured to: implement a single data source for accessing to transaction data associated with each type of transaction related to a user account; cause a receiver to receive user input data from a user computing device for requesting access to a type of transaction data related to the user account from the single data source, authenticate the user based on verifying the received user input data with pre-stored user data; route, in response to authenticating, to a transaction application programming interface (API) corresponding to the requested type of transaction data; call the transaction API via an API gateway to fetch the requested type of transaction data from the single data source, and cause a graphical user interface (GUI) of the user computing device to display the requested type of transaction data.

According to yet another aspect of the present disclosure, the processor may be further configured to: share the transaction API between the single data source and a system of record that stores transaction history data associated with each type of transaction related to the user account, wherein the single data source is responsible for fulfilling "get" requests, and wherein the system of record is responsible for fulfilling "post", or "put," or "patch." or "delete" requests, but the disclosure is not limited thereto.

According to another aspect of the present disclosure, the processor may be further configured to: filter the transaction data based on one or more of the following type of data: date range data, merchant data, payee data, category data, and amount data, but the disclosure is not limited thereto; and display the filtered transaction data in response to received user input data associated with type of data requested.

According to an additional aspect of the present disclosure, wherein, when accessing the single data source, if no response is received within a predetermined time period, the processor may be further configured to: automatically request again to fetch the transaction data from other system of record that stores the transaction data.

According to another aspect of the present disclosure, a non-transitory computer readable medium configured to store instructions for enhanced transaction utility is disclosed. The instructions, when executed, may cause a processor to: implement a single data source for accessing to transaction data associated with each type of transaction related to a user account, cause a receiver to receive user input data from a user computing device for requesting access to a type of transaction data related to the user account from the single data source; authenticate the user based on verifying the received user input data with pre-stored user data; route, in response to authenticating, to a transaction application programming interface (API) corresponding to the requested type of transaction data; call the transaction API via an API gateway to fetch the requested type of transaction data from the single data source; and cause a graphical user interface (GUI) of the user computing device to display the requested type of transaction data.

According to yet another aspect of the present disclosure, the instructions, when executed, may further cause the processor to: share the transaction API between the single data source and a system of record that stores transaction history data associated with each type of transaction related to the user account, wherein the single data source is responsible for fulfilling "get" requests, and wherein the system of record is responsible for fulfilling "post", or "put," or "patch," or "delete" requests, but the disclosure is not limited thereto.

According to another aspect of the present disclosure, the instructions, when executed, may further cause the processor to: filter the transaction data based on one or more of the following type of data: date range data, merchant data, payee data, category data, and amount data; and display the filtered transaction data in response to received user input data associated with type of data requested.

According to an additional aspect of the present disclosure, wherein, when accessing the single data source, if no response is received within a predetermined time period, the instructions, when executed, may further cause the processor to: automatically request again to fetch the transaction data from other system of record that stores the transaction data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
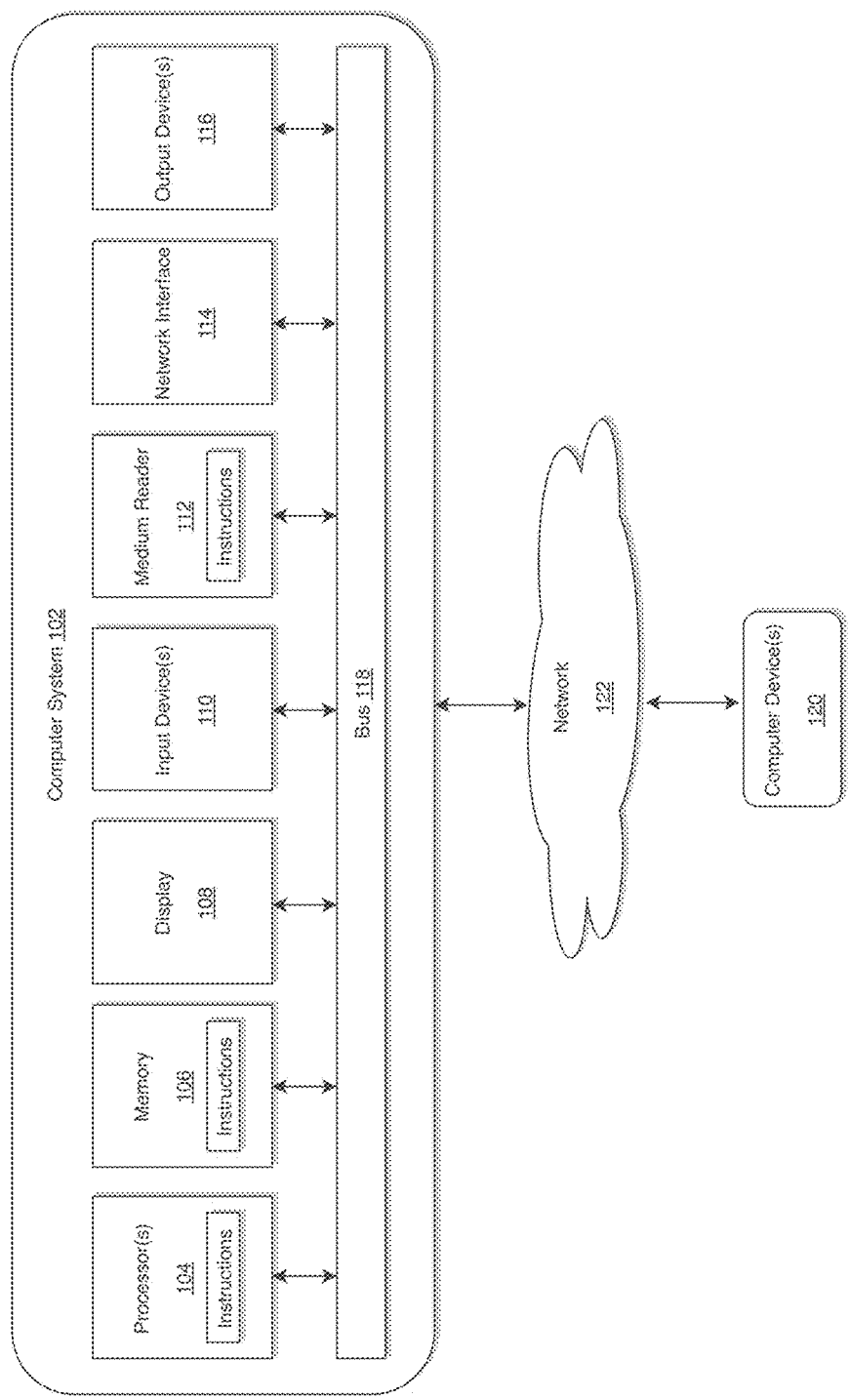
FIG. 1 illustrates a computer system for implementing an enhanced transaction utility in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, unit, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing an enhanced transaction utility module in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecured and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing an enhanced transaction utility module that provides one platform (e.g., a single point or a single source) for all transaction related informational data, thereby isolating the complexity of fetching transaction data from different sources and ensuring that transaction data are fetched by client applications in a secure, performant, and resilient way, but the disclosure is not limited thereto.

Figure 2:
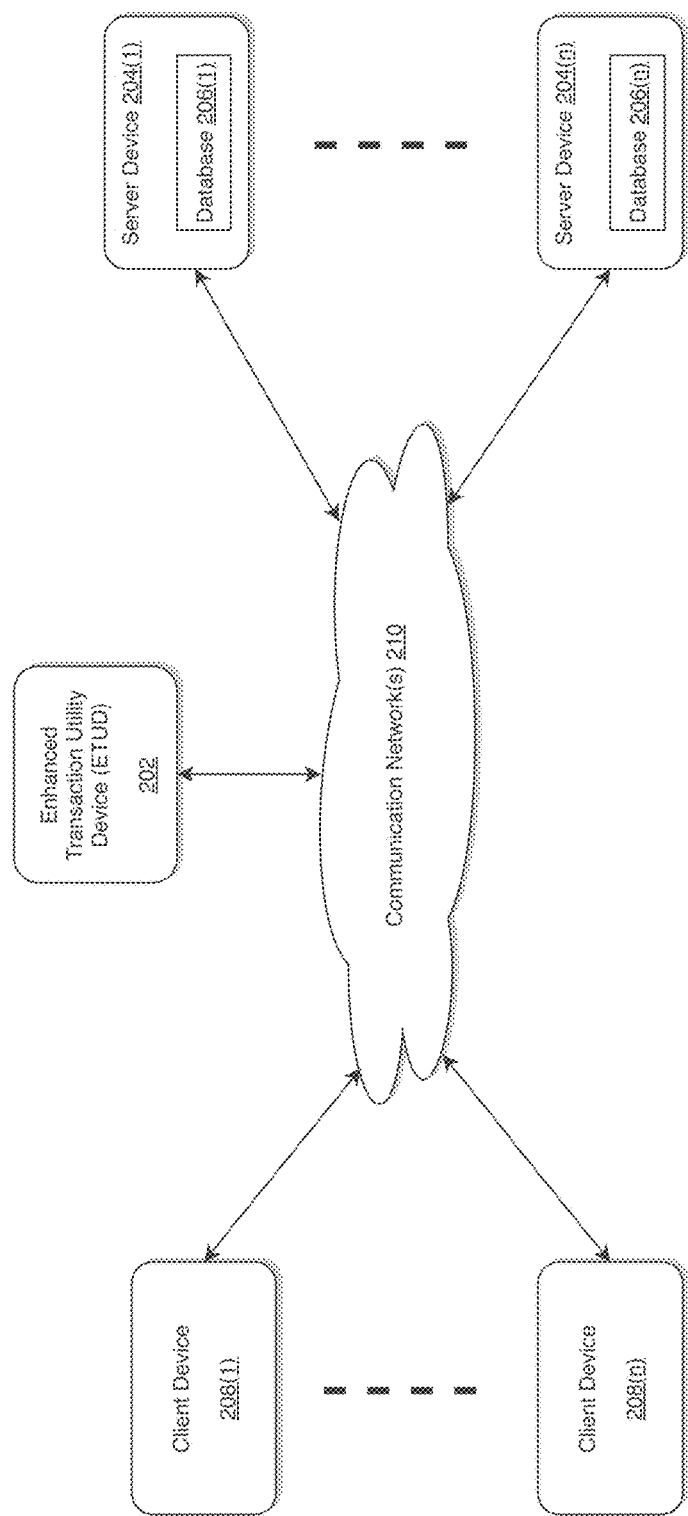
FIG. 2 illustrates an exemplary diagram of a network environment with an enhanced transaction utility device in accordance with an exemplary embodiment.

Referring to FIG. 2, a schematic of an exemplary network environment 200 for implementing an enhanced transaction utility device (ETUD) of the instant disclosure is illustrated.

According to exemplary embodiments, the above-described problems associated with conventional client applications may be overcome by implementing an ETUD 202 as illustrated in FIG. 2 by providing one platform (e.g., a single point or a single data source) for all transaction related informational data, thereby isolating the complexity of fetching transaction data from different sources and ensuring that transaction data are fetched by client applications in a secure, performant, and resilient way from the single point or the single data source, but the disclosure is not limited thereto.

The ETUD 202 may be the same or similar to the computer system 102 as described with respect to FIG. 1.

The ETUD 202 may store one or more applications that can include executable instructions that, when executed by the ETUD 202, cause the ETUD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ETUD 202 itself, may be located in virtual server(s) running in a cloud-based computing environment rather than being tied to one or more specific physical network computing devices. Also, the application(s) may be running in one or more virtual machines (VMs) executing on the ETUD 202. Additionally, in one or more embodiments of this technology, virtual machine(s) running on the ETUD 202 may be managed or supervised by a hypervisor.

In the network environment 200 of FIG. 2, the ETUD 202 is coupled to a plurality of server devices 204(1)-204(n) that hosts a plurality of databases 206(1)-206(n), and also to a plurality of client devices 208(l)-208(n) via communication network(s) 210. A communication interface of the ETUD 202, such as the network interface 114 of the computer system 102 of FIG. 1, operatively couples and communicates between the ETUD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ETUD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ETUD 202 may be a standalone device or integrated with one or more other devices or apparatuses, such as one or morn of the server devices 204(1)-204(n), for example. In one particular example, the ETUD 202 may be hosted by one of the server devices 204(1)-204(n), and other arrangements are also possible. Moreover, one or more of the devices of the ETUD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(l)-204(n) may include, among other features, one or more processors, a memory, and a communication interface, which are coupled together by a bus or other communication link, although other numbers and/or types of network devices may be used. The server devices 204(1)-204(n) in this example may process requests received from the ETUD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata set, data quality rules, and newly generated data.

Although the server devices 204(1)-204(n) are illustrated as single devices, one or more actions of each of the server devices 204(l)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the ETUD 202 that may be configured for implementing an enhanced transaction utility module that provides one platform (e.g., a single point or a single data source) for all transaction related informational data, thereby isolating the complexity of fetching transaction data from different sources and ensuring that transaction data are fetched by client applications in a secure, performant, and resilient way from the single point or the single data source, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the ETUD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ETUD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ETUD 202, the server devices 204(1)-204(n), or the client devices 208(1)-208(n), for example, may be configured to operate as virtual instances on the same physical machine. For example, one or more of the ETUD 202, the server devices 204(1)-204(n), or the client devices 208(1)-208(n) may operate on the same physical device rather than as separate devices communicating through communication network(s) 210. Additionally, there may be more or fewer ETUDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
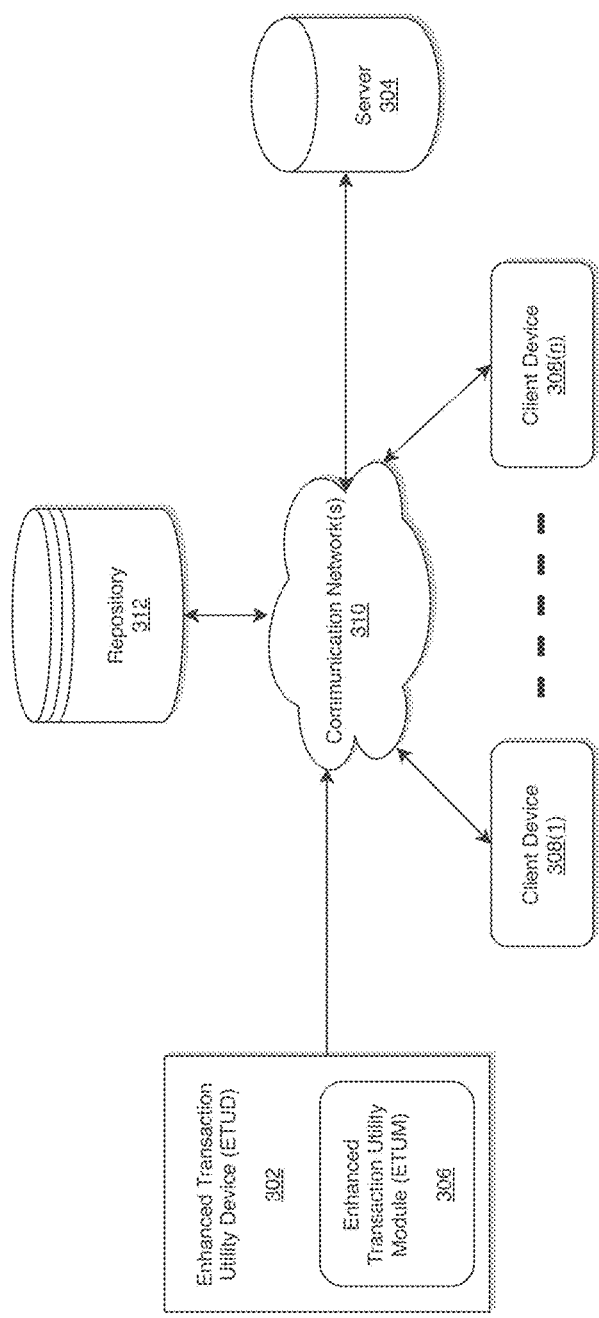
FIG. 3 illustrates a system diagram for implementing an enhanced transaction utility device with an enhanced transaction utility module in accordance with an exemplary embodiment.

FIG. 3 illustrates a system diagram for implementing an ETUD with an enhanced transaction utility module (ETUM) in accordance with an exemplary embodiment.

As illustrated in FIG. 3, the ETUD 302 including the ETUM 306 may be connected to a server 304, and a repository 312 via a communication network 310. The ETUD 302 may also be connected to a plurality of client devices 308(1)-308(n) via the communication network 310, but the disclosure is not limited thereto. According to exemplary embodiments, the ETUM 306 may be implemented within the client devices 308(1)-308(n), but the disclosure is not limited thereto. According to exemplary embodiments, the client devices 308(1)-308(n) may be utilized for software application development and machine learning model generations, but the disclosure is not limited thereto.

According to exemplary embodiment, the ETUD 302 is described and shown in FIG. 3 as including the ETUM 306, although it may include other rules, policies, modules, databases, or applications, for example. According to exemplary embodiments, the repository 312 may be embedded within the ETUD 302. Although only one repository 312 is illustrated in FIG. 3, according to exemplary embodiments, a plurality of repositories 312 may be provided. The repository 312 may include one or more memories configured to store transaction data associated with each type of transaction related to a user account, but the disclosure is not limited thereto. For example, the repository 312 may include one or more memories configured to store information including: rules, programs, production requirements, configurable threshold values defined by a product team to validate against service level objective (SLO), machine learning models, log data, hash values, etc., but the disclosure is not limited thereto. According to exemplary embodiments, the ETUM 306 may be configured to be storage platform agnostic—configured to be deployed across multiple storage layers.

According to exemplary embodiments, the ETUM 306 may be configured to receive continuous feed of data from the repository 312 and the server 304 via the communication network 310.

As will be described below, the ETUM 306 may be configured to implement a single data source for accessing to transaction data associated with each type of transaction related to a user account, cause a receiver to receive user input data from a user computing device for requesting access to a type of transaction data related to the user account from the single data source; authenticate the user based on verifying the received user input data with pre-stored user data; route, in response to authenticating, to a transaction application programming interface (API) corresponding to the requested type of transaction data, call the transaction API via an API gateway to fetch the requested type of transaction data from the single data source; and cause a graphical user interface (GUI) of the user computing device to display the requested type of transaction data, but the disclosure is not limited thereto.

The plurality of client devices 308(1)-308(n) are illustrated as being in communication with the ETUD 302. In this regard, the plurality of client devices 308(1)-308(n) may be "clients" of the ETUD 302 and are described herein as such. Nevertheless, it is to be known and understood that the plurality of client devices 308(1)-308(n) need not necessarily be "clients" of the ETUD 302, or any entity described in association therewith herein. Any additional or alternative relationship may exist between either or more of the plurality of client devices 308(1)-308(n) and the ETUD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the ETUD 302 via broadband or cellular communication. Of course, these embodiments are merely exemplary and are not limiting or exhaustive.

Figure 4:
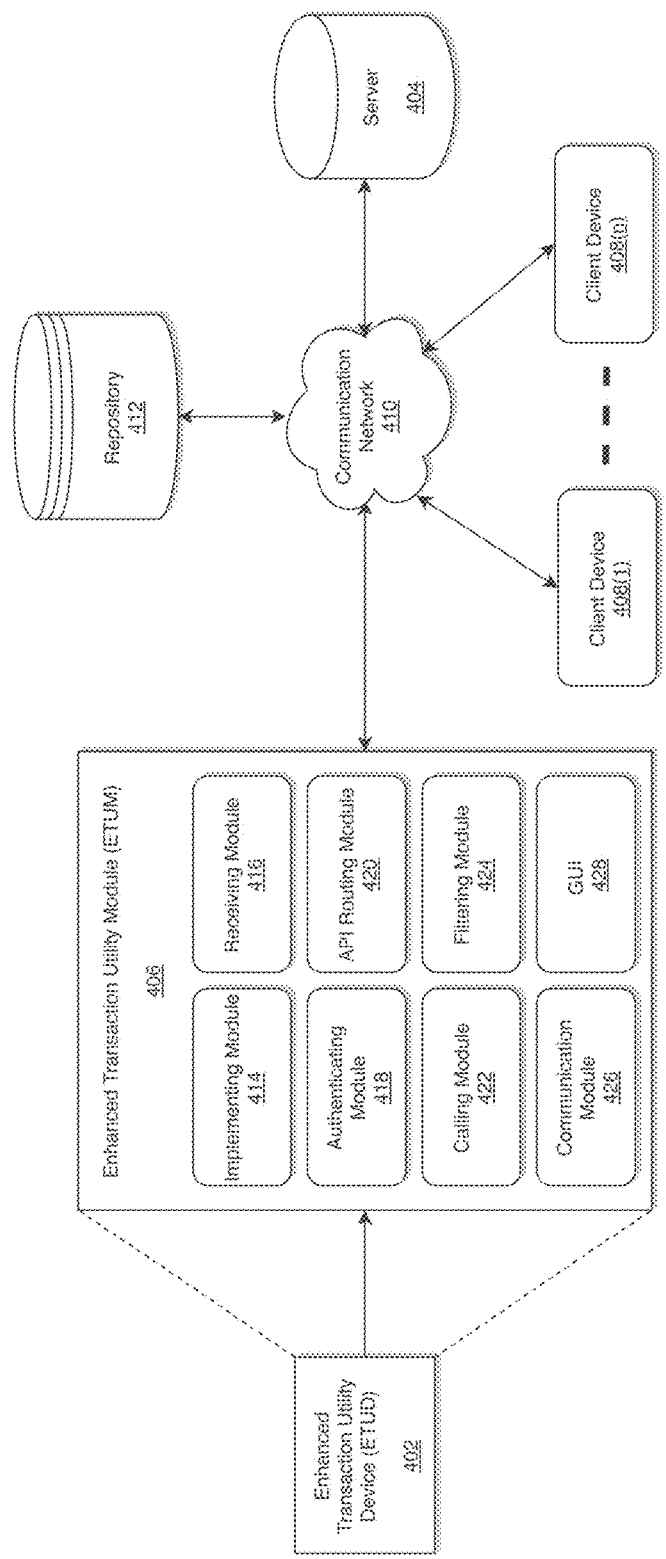
FIG. 4 illustrates a system diagram for implementing an enhanced transaction utility module of FIG. 3 in accordance with an exemplary embodiment.

FIG. 4 illustrates a system diagram for implementing an enhanced transaction utility module of FIG. 3 in accordance with an exemplary embodiment. As illustrated in FIG. 4, the system 400 may include an ETUD 402 within which an ETUM 406 may be embedded, a repository 412, a server 404, client devices 408(1)-408(n), and a communication network 410. According to exemplary embodiments, the ETUD 402, ETUM 406, repository 412, the server 404, the client devices 408(1)-408(n), and the communication network 410 as illustrated in FIG. 4 may be the same or similar to the ETUD 302, the ETUM 306, the repository 312, the server 304, the client devices 308(1)-308(n), and the communication network 310, respectively, as illustrated in FIG. 3.

According to exemplary embodiments, the repository 312, 412 may also be a cloud-based repository that supports user authentication, repository security, and integration with existing databases and developments, but the disclosure is not limited thereto.

As illustrated in FIG. 4, the ETUM 406 may include an implementing module 414, a receiving module 416, an authenticating module 418, an API routing module 420, a calling module 422, a filtering module 424, a communication module 426, and a GUI 428. According to exemplary embodiments, the repository 412 may be external to the ETUD 402 may include various systems that are managed and operated by an organization. Alternatively, according to exemplary embodiments, the repository 412 may be embedded within the ETUD 402 and/or the ETUM 406.

The process may be executed via the communication module 426 and the communication network 410, which may comprise plural networks as described above. For example, in an exemplary embodiment, the various components of the ETUM 406 may communicate with the server 404, and the repository 412 via the communication module 426 communication network 410. Of course, these embodiments are merely exemplary and are not limiting or exhaustive.

According to exemplary embodiments, the communication network 410 and the communication module 426 may be configured to establish a link between the repository 412, the client devices 408(1)-408(n) and the ETUM 406.

According to exemplary embodiments, each of the implementing module 414, receiving module 416, authenticating module 418, API routing module 420, calling module 422, filtering module 424, and the communication module 426 may be implemented by microprocessors or similar, they may be programmed using software (e.g., microcode) to perform various functions discussed herein and may optionally be driven by firmware and/or software. Alternatively, each of the implementing module 414, receiving module 416, authenticating module 418, API routing module 420, calling module 422, filtering module 424, and the communication module 426 may be implemented by dedicated hardware, or as a combination of dedicated hardware to perform some functions and a processor (e.g., one or more programmed microprocessors and associated circuitry) to perform other functions. Also, according to exemplary embodiments, each of the implementing module 414, receiving module 416, authenticating module 418, API routing module 420, calling module 422, filtering module 424, and the communication module 426 may be physically separated into two or more interacting and discrete blocks, units, devices, and/or modules without departing from the scope of the inventive concepts.

According to exemplary embodiments, each of the implementing module 414, receiving module 416, authenticating module 418. API routing module 420, calling module 422, filtering module 424, and the communication module 426 of the ETUM 406 may be called by corresponding API.

According to exemplary embodiments, the implementing module 414 may be configured to implement a single data source for accessing to transaction data associated with each type of transaction related to a user account. The receiving module 416 may be configured to receive user input data from a user computing device (e.g., client devices 408(1)-408(n)) for requesting access to a type of transaction data related to the user account from the single data source.

According to exemplary embodiments, the authenticating module 418 may be configured to authenticate the user based on verifying the received user input data with pre-stored user data.

According to exemplary embodiments, the API routing module 420 may be configured to route, in response to authenticating, to a transaction API corresponding to the requested type of transaction data.

According to exemplary embodiments, the calling module 422 may be configured to call the transaction API via an API gateway to fetch the requested type of transaction data from the single data source.

According to exemplary embodiments, the GUI 428 may be configured to display the requested type of transaction data onto the GUI 428.

According to exemplary embodiments, the ETUM 406 may be configured to share the transaction API between the single data source and a system of record that stores transaction history data associated with each type of transaction related to the user account. The single data source may be responsible for fulfilling "get" requests, and the system of record may be responsible for fulfilling "post", or "put," or "patch," or "delete" requests, but the disclosure is not limited thereto.

According to exemplary embodiments, the single data source may be a system of record for transaction level data for assisted and unassisted servicing ensuring that the user gets a consistent view of the transaction data from a single source, but the disclosure is not limited thereto.

According to exemplary embodiments, the single data source may be configured to make the transaction data available for read access via a set of small, independently versioned, and scalable services with specific business goals, but the disclosure is not limited thereto.

According to exemplary embodiments, the single data source may be configured to store a complete set of commonly used fields for each type of transaction, transaction data enrichment, and supplementary data, but the disclosure is not limited thereto.

According to exemplary embodiments, the transaction data enrichment may include one or more of the following data: cleansed counterparty name data, cleansed category data, deduced recurring indicator data, and card on file indicator data, but the disclosure is not limited thereto.

According to exemplary embodiments, wherein the supplementary data may include one or more of the following data to identify a transaction: automated clearing house (ACH) payee information data and real-time payment (RTP) payee information data, but the disclosure is not limited thereto.

According to exemplary embodiments, the ETUM 406 may be configured to filter the transaction data based on one or more of the following type of data: date range data, merchant data, payee data, category data, and amount data, but the disclosure is not limited thereto; and cause the GUI 428 to display the filtered transaction data in response to received user input data associated with type of data requested.

According to exemplary embodiments, wherein, when accessing the single data source, if no response is received within a predetermined time period, the ETUM 406 may be configured to automatically request again to fetch the transaction data from other system of record that stores the transaction data.

According to exemplary embodiments, the ETUM 406 may be configured in a manner such that applications needing transaction data will get that data either through the consumption of well-defined APIs and/or the subscription to transaction level and enrichment data change events that are published from the single data source (may also be referred to as customer/product account transaction utility).

According to exemplary embodiments, the ETUM 406 may be configured in a manner such that utility services may provide common business-related functions that are consistent across products, customer journeys and channels. These are essential to autonomous architecture as they directly support the autonomous applications that are needed for the products. Utility services may help avoid waste and unwanted redundancy across products by enabling smart reuse of these narrowly defined functions as disclosed herein that do not change behavior across the business.

According to exemplary embodiments, the ETUM 406 may be configured in a manner such that the utility services may have similar characteristics to platform services, e.g., event streaming, database management, etc. in that they are business invariant and are expected to be operated as managed services. However, according to exemplary embodiments, the ETUM 406 may be configured in a manner such that the utility services may be designed primarily in the business context of customer journeys and use cases. Utility services may provide the common and consistent business functions that serve as the "glue" in the architecture of products—which may emphasize customer-centeredness, autonomy, and smart re-use as follows, but the disclosure is not limited thereto: customers may have interactions with the products through their journeys using one or more channels; channels may enable specific experiences using experience APIs, products may have a unique set of autonomous applications that support the customer interactions; autonomous applications may have little or no dependency on one another—they may communicate with each other through APIs and events; utility services may provide common and consistent functions that may be required by multiple products; business rules may be part of the product's autonomous applications—common business rules may be found in the utility services.

According to exemplary embodiments, the ETUM 406 may be configured in a manner such that each utility service may fulfill a specific, narrowly defined purpose. Utility services may typically focus on aggregating data to create a unified view of information and services that can be consumed through APIs by autonomous services that are aligned to products.

According to exemplary embodiments, the ETUM 406 may be configured in a manner such that the utility services may be used and re-used by multiple products. The use of utility services may enable minimizing unwanted redundancy and waste across products.

According to exemplary embodiments, the ETUM 406 may be configured in a manner such that the utility services may be made up of those elements that are truly common and consistent regardless of how they are consumed. They may be considered to be business invariant in that the business logic does not change for products, channels or use cases.

According to exemplary embodiments, the ETUM 406 may be configured in a manner such that the utility services are autonomous and exhibit the same characteristics as a "product". According to exemplary embodiments, the ETUM 406 may be configured in a manner such that the utility services: have a business product owner and a single backlog; are focused on a specific purpose/need they are fulfilling for their consumers; they have very clear boundaries, which are the business domains, e.g., payments, fraud, customer, etc.; are there for any/all to consume a business domain-specific function, and therefore do not include any use-case specific logic (i.e., they are consumed one way for all consumers, no custom APIs), own the business domain data needed for their domain function, and therefore are either the system of record or the only authorized data source for that data; can be made up of multiple autonomous services; are supported by autonomous feature teams; are loosely coupled with other products; can publish and subscribe to events—they are invoked by other autonomous services through APIs; have the characteristics of a managed service with continuously improved reliability, enhanced resiliency, predictable stability, proactively enforced controls, demonstrated elasticity and scale.

According to exemplary embodiments, the ETUM 406 may be configured in a manner such that the customer/product account transaction utility is an umbrella for set of product-specific transaction services. There will be common attributes, e.g., transaction type, date, amount, counterparty name (e.g. payee, merchant), category, as well as attributes specific to the product's transactions. However, the overall interface/behavior of each product's transaction API must be the same, so that the consumers (including external parties) have a consistent experience as follows, but the disclosure is not limited thereto: query parameters—account identifier, date range, category, counterparty name, amount, transaction type, number of records, page size, etc.; fuzzy search; support for pagination, error codes, resiliency; performance, reconciliation with the system of record; adherence to the new banking architecture.

According to exemplary embodiments, the customer/product account transaction utility may provide better data consistency, faster release cycles, and fault isolation.

For example, for data consistency, the ETUM 406 may be configured in a manner such that transaction level data for assisted and unassisted servicing may only be available via the customer/product account transaction utility, thereby ensuring that consumers (and advisors) are always getting a consistent view of the data from a single source. Read access to transaction level data and enrichments outside of the customer/product account transaction utility may not be permitted—applications needing transaction data may get that data either through the consumption of well-defined APIs and/or the subscription to transaction level and enrichment data change events that are published from the customer/product account transaction utility.

In addition, for data consistency, the ETUM 406 may be configured in a manner such that applications requiring transaction level data for purposes of simple aggregation may use customer/product account transaction utility bulk data APIs to fetch the data without the need for pagination. Applications that need to perform more complex aggregations may keep a local read-only copy of the transaction data; refreshes of this data may be done through the subscription to data change events published from the customer/product account transaction utility. Batch processing may be replaced with event messaging, thereby enabling more timely access to transaction data changes.

For faster release cycles, the ETUM 406 may be configured in a manner such that it may implement autonomous services that are small and independently deployable, thereby ensuring continuous integration and delivery, and automated testing and deployment.

For fault isolation, the ETUM 406 may be configured in a manner such that switchable environments may be used to address the challenges of automated deployment to minimize downtime.

According to exemplary embodiments, the types of transaction data in scope of the customer/product account transaction utility may include, but not limited thereto, the following data: credit/debit card data (e.g., authorization, adjustment, change, cash advance, fee, refund, reversal, payment, return, sale (rewards earned, trip details), etc.); enrichments (e.g., merchant name and URL; recurring indicator, card on file indicator, categorization, etc.), demand deposit account (DDA) (e.g., authorization, account transfer, ACH credit/debit, adjustment/reversal. ATM, bill payment, card, check, deposit, wire transfer, loan payment, ACH/RTP details, etc.), merchant services (e.g., authorized sales, deposits, disputes, fees, adjustments, etc.) home lending (e.g., payments, disbursements, interest, fees, etc.), lines of credit (e.g., payments, disbursements, interest, fees, etc.); auto (e.g., payments, interest, fees, etc.); investment (e.g., buy, dividend, reinvest, sell, etc.), external transactions (e.g., statement, transactions, etc.). Clients may need to access other domains for related information, e.g., details of a dispute or fraud case. Payment instructions, while ultimately resulting in the posting of a payment transaction, are not "transactions" in and of themselves and may not be included in the scope of the customer/product account transaction utility.

Some of the data coming in from the payment networks may be inconsistent, e.g., merchant name, card on file, recurring, etc. According to exemplary embodiments, the ETUM 406 may be configured in a manner such that applications may make their own determinations and contribute them to the customer/product account transaction utility for distribution.

According to exemplary embodiments, the ETUM 406 may be configured in a manner such that the customer/product account transaction utility is an umbrella for a set of product transaction services. For example, the ETUM 406 may be configured in a manner such that transaction domain may be broken down into a number of autonomous applications based on product; account processing platforms may publish events for posted transactions and pending authorizations/memo postings; transaction enrichment processes may publish enrichment events that the customer/product account transaction utility will store and make available via APIs; consuming applications may get transaction and enrichment data via APIs provided by the customer/product account transaction utility; consuming applications that need data related to transactions, e.g., rewards or payment instruction details, may go to the appropriate domain services for the information, consuming applications can get an aggregate view of transaction data to enable specific customer experiences through the consumption of the aggregate transaction view, any applications needing to update transaction data, e.g., disputes, may use APIs provided by the account processing platforms, applications that have been approved to keep a local copy of transaction data (either transaction level or in aggregate), may refresh their local copies by consuming transaction an enrichment data change events published by the customer/product account transaction utility, and applications that need a summary view of transactions or "insights" may choose to get that type of aggregated information from an application for data acquisition.

According to exemplary embodiments, an application for the customer/product account transaction utility may be an authoritative data source for transaction history and details for assisted and unassisted servicing channels, as well as external aggregators, via APIs and in specific use cases and events. The application for the customer/product account transaction utility may also be a system of record for enhanced transaction details, e.g., cleansed counterparty name, cleansed category, deduced recurring indicator, card on file indicator, etc.

According to exemplary embodiments, an application for account processing platform may be a system of record for transaction history and details for core processing (e.g., posting, pricing, balance management, statements, etc.).

According to exemplary embodiments, another application may be responsible for data acquisition, development, generation, and distribution of timely and relevant customer observations, predictions, and recommendations to all of the digital channels via APIs and events. This application may utilize transaction data from the customer/product account transaction utility to generate summaries and insights.

According to exemplary embodiments, another application may be responsible for enriching the DDA and credit card transaction data with cleansed and enriched merchant/counterparty names, categories, etc. Any application that is enriching transaction details for servicing purposes send those enrichments to the customer/product account transaction utility for inclusion in transaction details.

Figure 5:
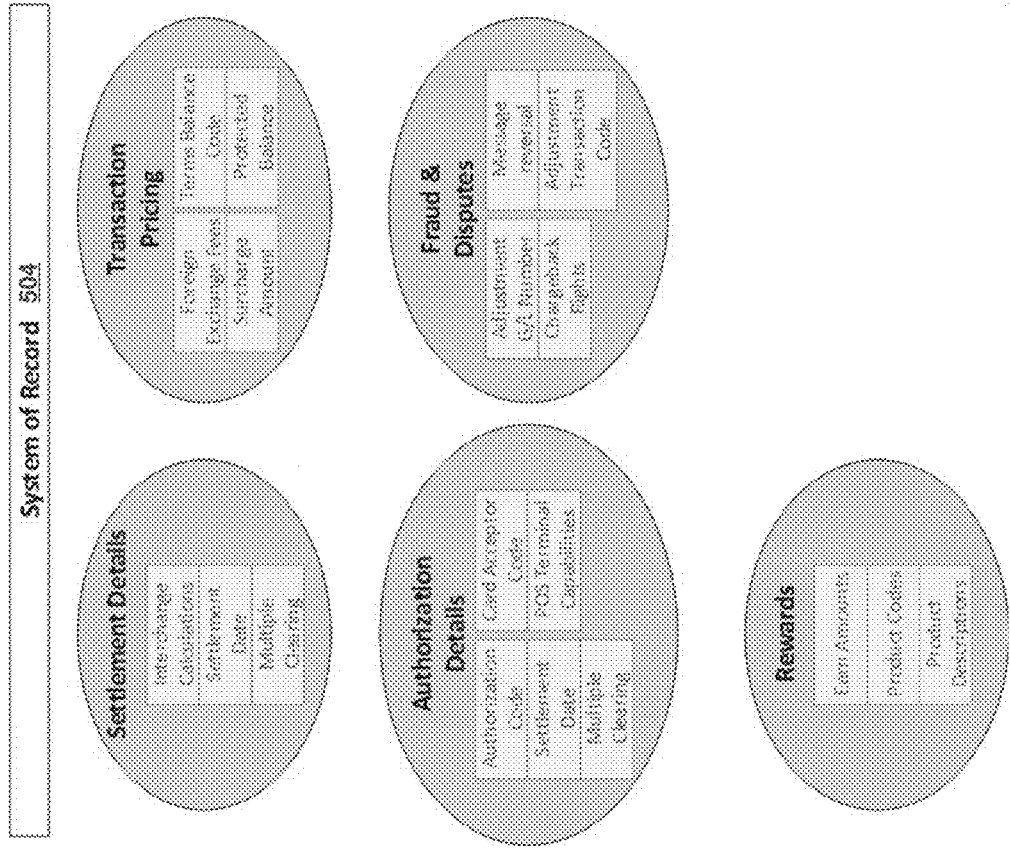
FIG. 5 illustrates an exemplary chart that exemplifies credit card transaction data in scope for a customer/product account transaction utility in accordance with an exemplary embodiment.
Figure 5:
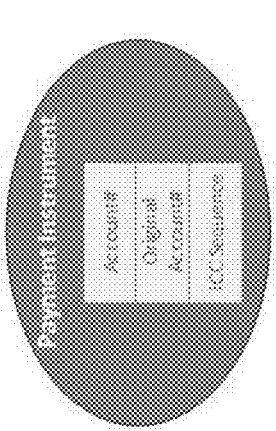
Figure 5:
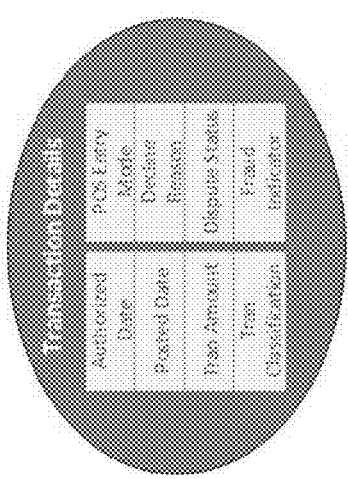
Figure 5:
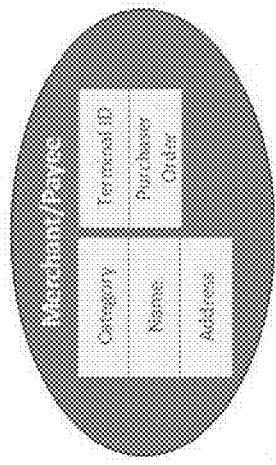

FIG. 5 illustrates an exemplary chart 500 that exemplifies credit card transaction data in scope for the customer/product account transaction utility 502, but the disclosure is not limited thereto. According to exemplary embodiments, a system of record 504 may be accessed for some classes of data as illustrated in FIG. 5. For example, if a client needs information about a transaction that belongs to another domain, e.g. rewards earnings or disputes details, that domain may be accessed for obtaining data for the details. Decisions on the inclusion of transaction details from the core platforms in the customer/product account transaction utility 502 may need to be made on a case by case basis, based on documented use cases for assisted and unassisted servicing.

According to exemplary embodiments, the ETUM 406 may be implemented for use cases, such as, account activity, transaction detail, and transaction summary, but the disclosure is not limited thereto.

According to exemplary embodiments, for the account activity use case, a product or experience may need to provide a list of transactions for a given account, perhaps titered by date range, merchant/payee, type, category, amount range, etc. The API routing module 420 of the ETUM 406 may route to history APIs and will use the history APIs for the associated product (e.g., credit card), which will return general information about the transaction (e.g., date, description (cleansed merchant/payee name), category, amount, etc.). Results may be returned paginated and may include a calculated running balance, but the disclosure is not limited thereto.

According to exemplary embodiments, for the transaction detail use case, a product or experience may need to provide details of a particular transaction. The API routing module 420 of the ETUM 406 may route to detail APIs and will use the detail APIs for the associated product (e.g. credit card), which will return detailed information about the transaction (token requestor ID, gratuity amount, recurring payment indicator, industry type code, date, description, category, amount, etc.), but the disclosure is not limited thereto.

According to exemplary embodiments, for the transaction summary use case, a product or experience may want to aggregate transaction data across multiple accounts and/or products, on the fly. The API routing module 420 of the ETUM 406 may route to bulk data APIs and will use the "light weight" bulk data APIs that return common data elements across accounts/products, without pagination.

According to exemplary embodiments, for the transaction summary use case, a product or experience may want to aggregate transaction data across multiple accounts and/or products, ahead of time for performance reasons, e.g., goals and financial management. The ETUM 406 may be configured in a manner such that it may leverage an application to provide summaries and/or insights or consume transaction and transaction enrichment events, published by the customer/product account transaction utility, to continually maintain an aggregate view of the data needed to render the summaries in a performant manner.

According to exemplary embodiments, the customer/product account transaction utility and system of record developers may need to ensure that the transaction API is consistent for each financial product when it comes to resource names, resource attributes, and parameters.

According to exemplary embodiments, the ETUM 406 may be configured such that a dashboard or homepage could be rendered via a series of interactions between a client application and an experience service application that orchestrates interactions across the authentication, customer, digital profile, accounts and transactions domains to support the desired user experience.

According to exemplary embodiments, from the dashboard view which includes a summary of transaction information, the user can select a transaction to view more details which invokes a request to the customer/product account transaction utility to retrieve the transaction information that will be maintained in this platform. This may include enhanced merchant or location information that is only available through the utility, but the disclosure is not limited thereto.

According to exemplary embodiments, the transaction details page may be displayed on the GUI 428 providing the user die option to initiate a dispute for a charge. For the purposes of this example, disputes may be managed as a product so the request to initiate a dispute would trigger interaction with that product domain. In this example, the dispute product may have business rules based on transaction details, account details and the customer information. Some of the transaction details required for dispute logic may not be available through the transaction or account utilities so the financial product (e.g., credit card) transaction service would be leveraged. The disputes experience service may aggregate data from the customer, account and transaction domains to pass to the disputes product to execute rules. For example, if the customer were a private bank customer, the rules could just indicate that the transaction should be credited to the customer if under a certain dollar threshold without requiring additional feedback.

According to exemplary embodiment, the disputes product may execute rules to determine the options to be presented to the user to proceed with the dispute initiation. The client application may present these options to the user. To reduce remote calls, when the dispute product service returns the set of options to display for dispute initiation, it could include clarifying questions with each option. The client application may decide if the questions are displayed up front or only displayed based on user selection.

According to exemplary embodiments, the clarifying questions returned in the initial disputes product interface may be displayed and the user may select an option, which will trigger a new request to the disputes product service. Because this operation requires additional orchestration, a disputes experience service can be used to accept the request and perform this orchestration. If the request initiated through another channel, this workflow could be different but the product service would not change.

In this example, the transactions utility advanced search capability would be leveraged by the disputes product to search for duplicate transactions. The advanced search capability would be unique to the transactions utility and would allow for searching against enhanced merchant details, apply fuzzy matching logic and use other capabilities to look for transactions which may be employed across different financial products. In this example, the search may only find the original transaction from the dispute. The search results would be returned to the product domain to determine the outcome.

The product rules may determine that no matching charge is found so the user should identify a different reason if they would like to continue with a dispute for the transaction.

If a dispute were initiated, the dispute product might store a record in its local repository that a dispute case was initiated with information on the type of dispute and any rules that were applied to the dispute in question. It would store a transaction ID that could be used to reference the transaction information in the transaction utility or in the financial product domain as needed based on its business workflow.

Figure 6:
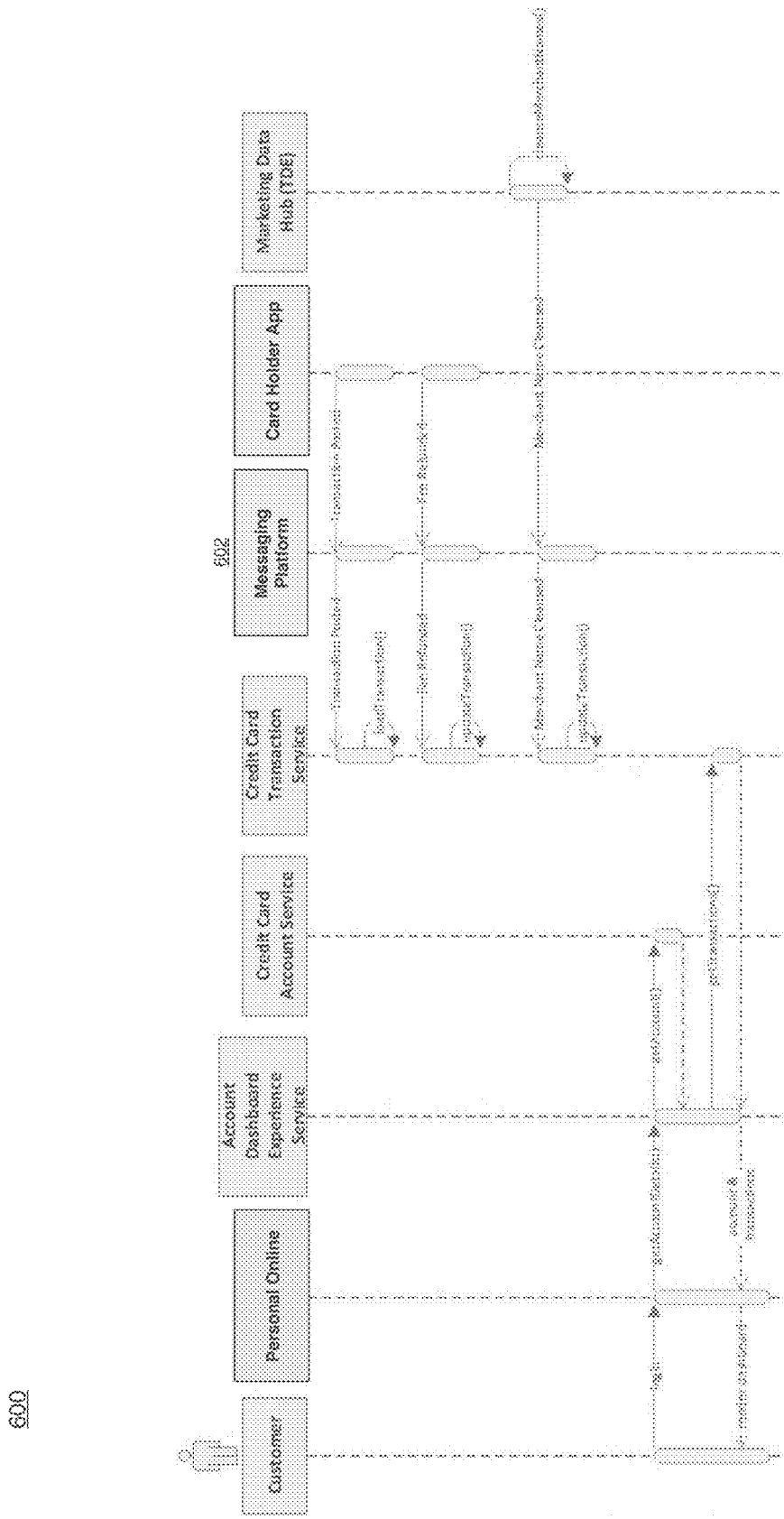
FIG. 6 illustrates an exemplary use case of customer/product account transaction utility interactions in accordance with an exemplary embodiment.

FIG. 6 illustrates an exemplary use case of the customer/product account transaction utility interactions which illustrates population of the customer/product account transaction utility and basic read. According to the exemplary flow diagram 600 as illustrated in FIG. 6, as transactions are posted/updated and enrichments are created, events are streamed to a messaging platform 602 and then consumed by the customer/product account transaction utility for ingestion.

Figure 7:
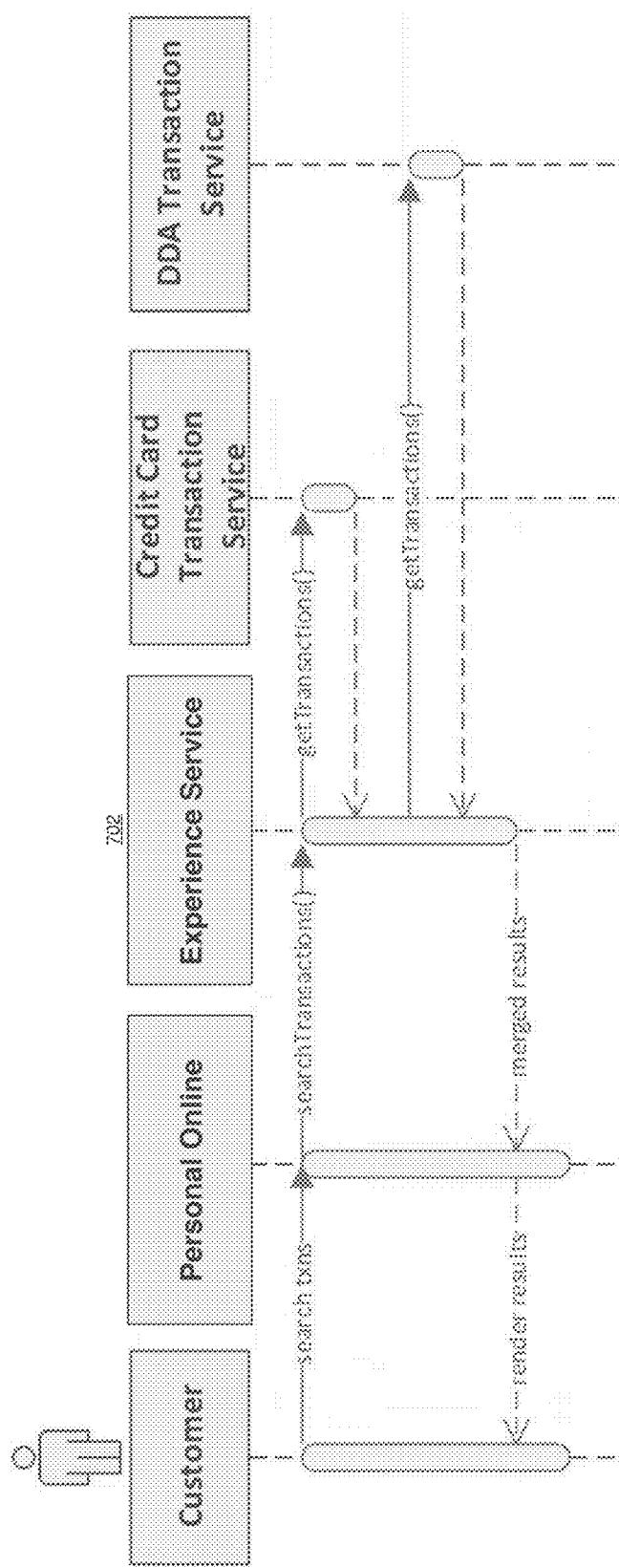
FIG. 7 illustrates an exemplary use case of customer/product account transaction utility interactions which illustrates cross product transaction search in accordance with an exemplary embodiment.

FIG. 7 illustrates an exemplary use case of the customer/product account transaction utility interactions which illustrates cross product transaction search. According to the exemplary flow diagram 700 as illustrated in FIG. 7, each product will have its own transaction service. In order to search for transactions across products, an experience service 702 will call the individual product transaction services and merge the results. The experience service 702 will need to track how many pages have been returned from each product transaction service. The calls to each product transaction service can be done in parallel to reduce latency.

Figure 8:
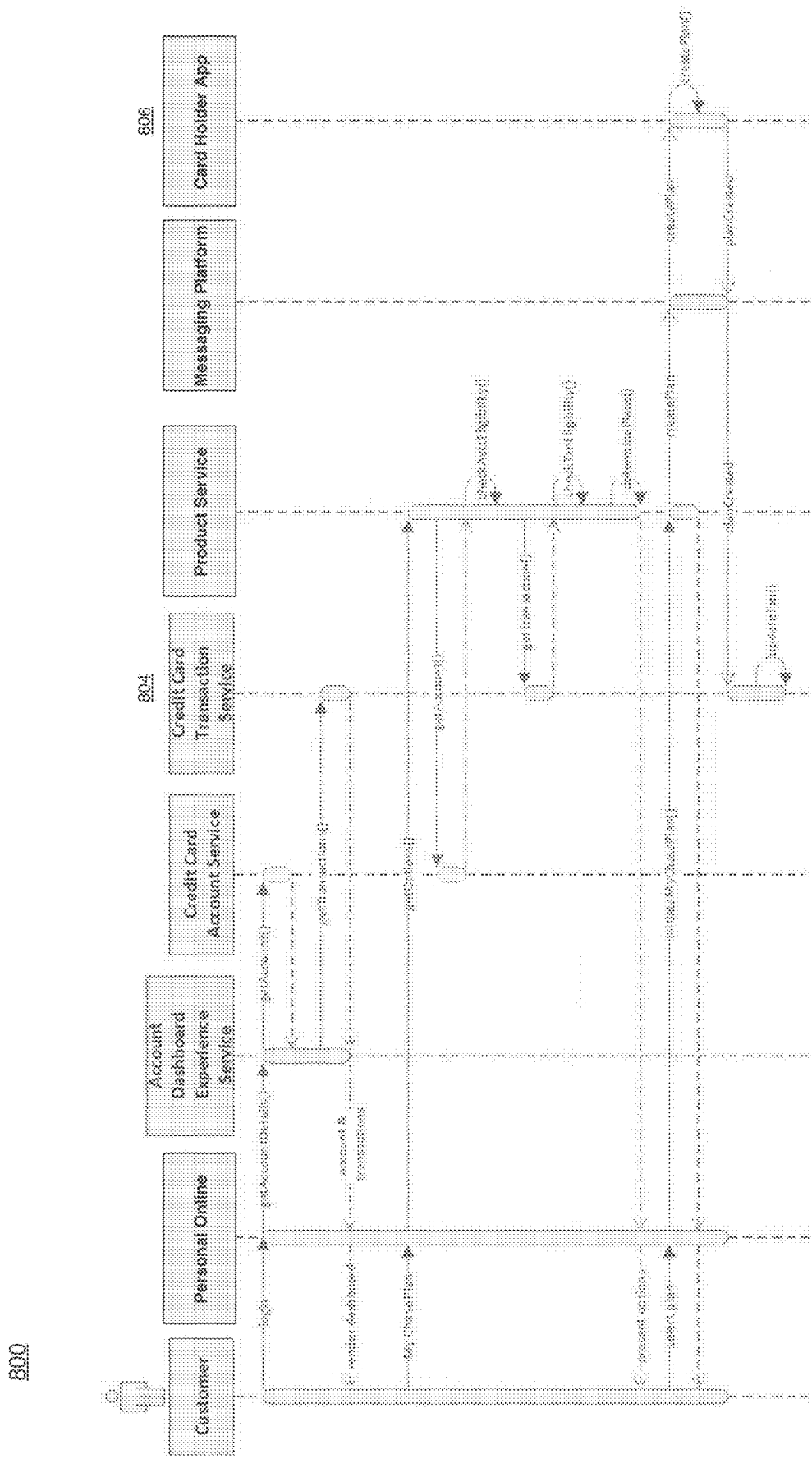
FIG. 8 illustrates an exemplary use case of the customer/product account transaction utility interactions which illustrates slice workflow in accordance with an exemplary embodiment.

FIG. 8 illustrates an exemplary use case of the customer/product account transaction utility interactions which illustrates slice workflow 800. According to the exemplary slice workflow 800 as illustrated in FIG. 8, if a transaction is added to a customer plane, card holder application 806 will publish an event and the credit card transaction service 804 will consume the event and update the transaction.

Figure 9:
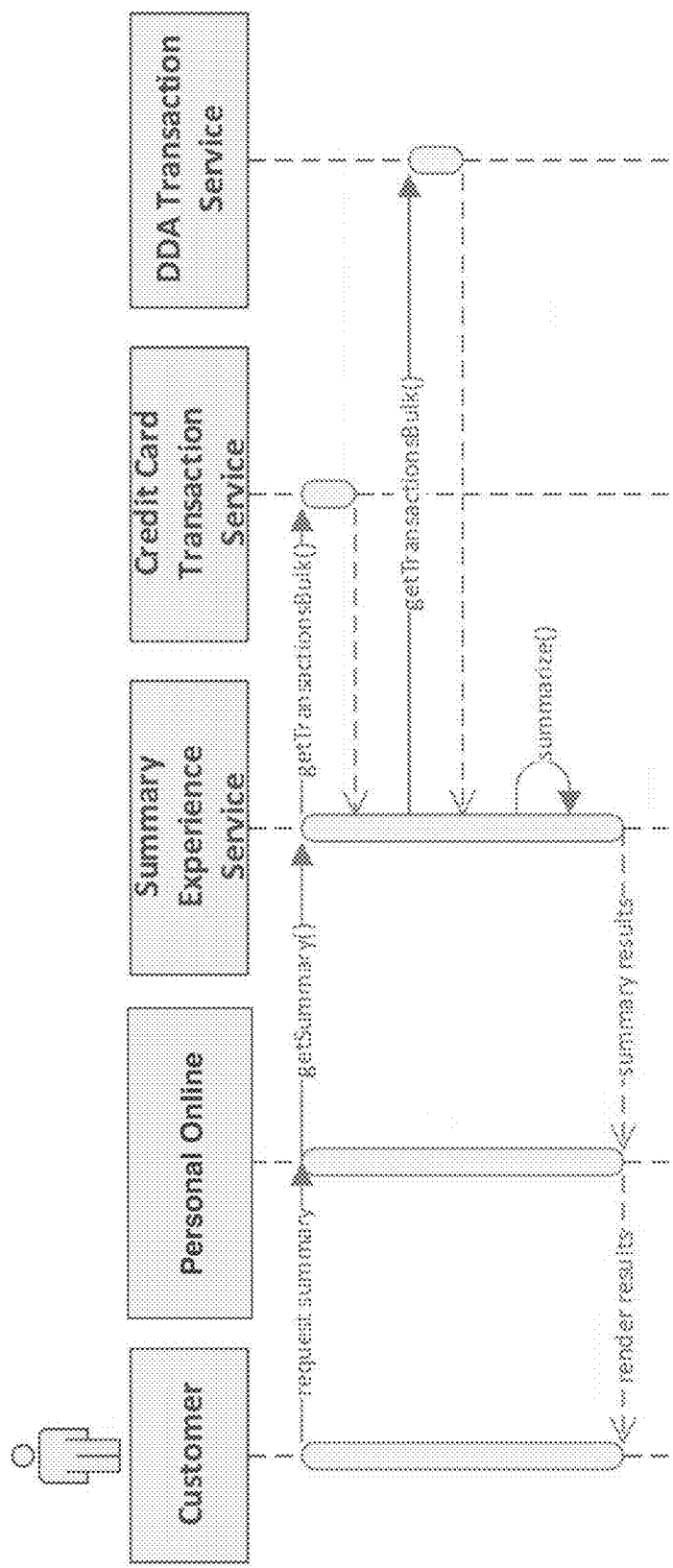
FIG. 9 illustrates an exemplary use case of customer/product account transaction utility interactions which illustrates an example of transaction summaries in accordance with an exemplary embodiment.

FIG. 9 illustrates an exemplary use case of the customer/product account transaction utility interactions which illustrates an example of transaction summaries. According to the exemplary flow diagram 900 as illustrated in FIG. 9, experience services uses the "light weight" bulk data APIs that return common data elements across accounts/products, without pagination.

Figure 10:
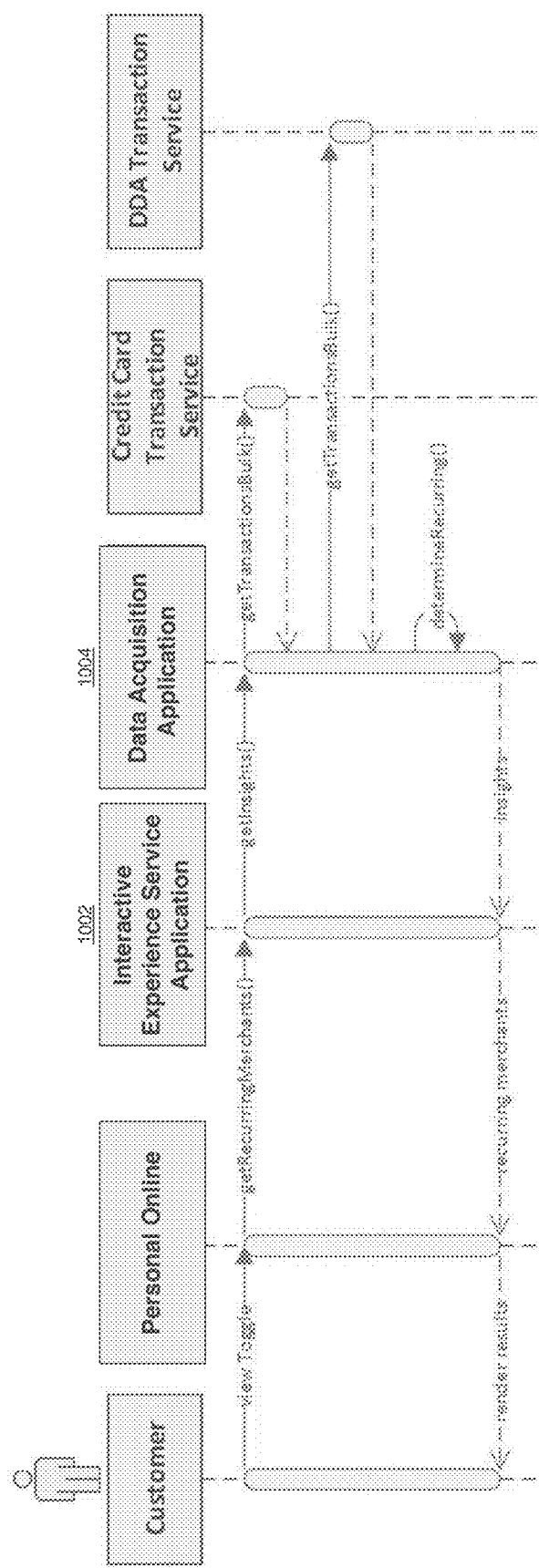
FIG. 10 illustrates an exemplary use case of customer/product account transaction utility interactions which illustrates another example of transaction summaries in accordance with an exemplary embodiment.

FIG. 10 illustrates an exemplary use case of the customer/product account transaction utility interactions which illustrates another example of transaction summaries. According to the exemplary flow diagram 1000 as illustrated in FIG. 10, interactive experience service application 1002 leverages data acquisition application 1004 to provide summaries and/or insights. The data acquisition application 1004 may utilize the "light weight" bulk data APIs.

Figure 11:
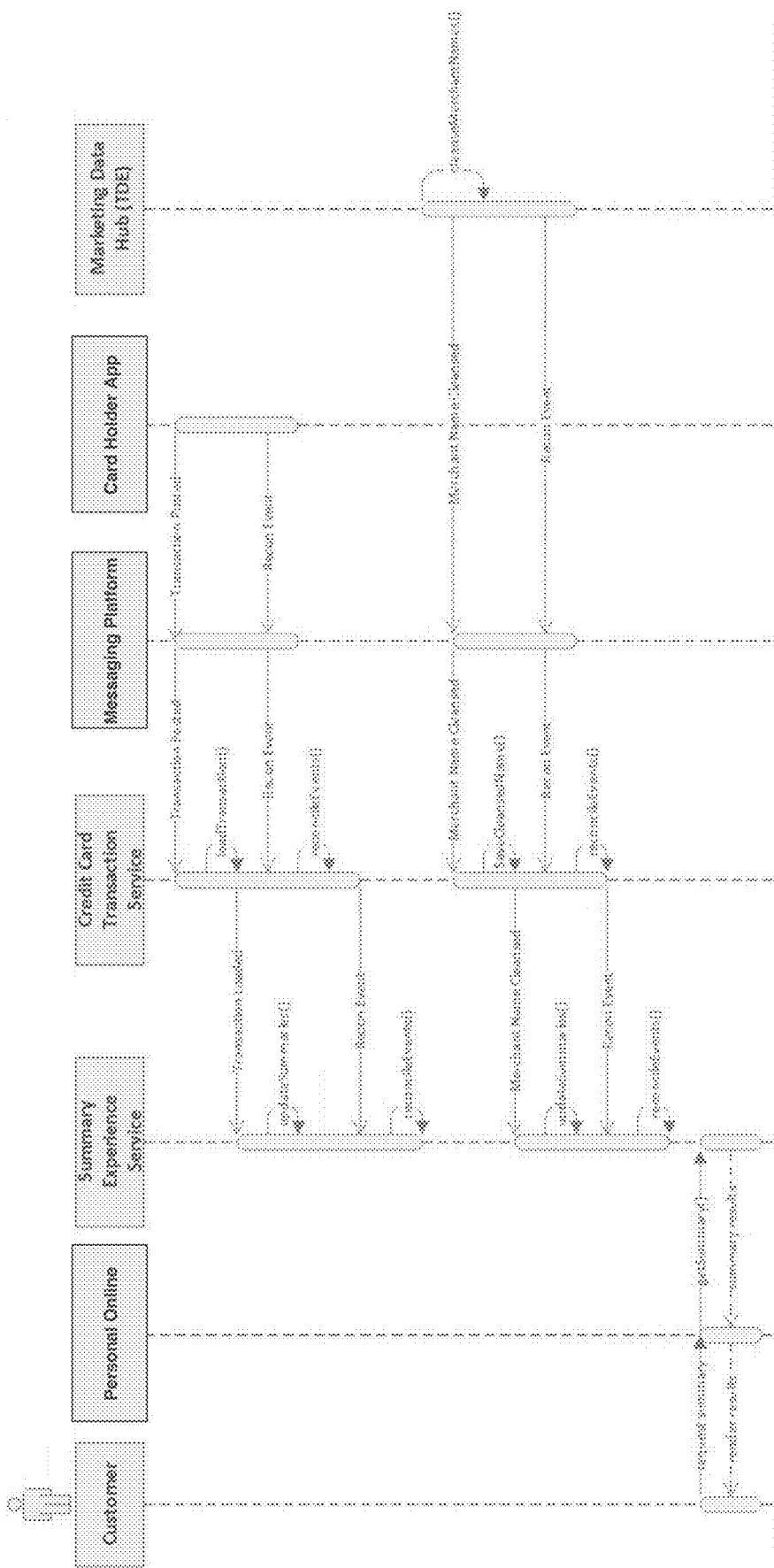
FIG. 11 illustrates an exemplary use case of customer/product account transaction utility interactions which illustrates another example of transaction summaries for maintaining a local summarized copies of transactions in accordance with an exemplary embodiment.

FIG. 11 illustrates an exemplary use case of the customer/product account transaction utility interactions which illustrates another example of transaction summaries for maintaining a local summarized copies of transactions. According to the exemplary flow diagram 1100 as illustrated in FIG. 11, when a summary experience needs to maintain a local summarized copy of transactions for performance reasons, it will consume transaction and transaction enrichment events, published by the customer/product account transaction utility, to continually maintain an aggregate view of the data needed to render the summaries in a performant manner. At each stage, event reconciliation will need to be performed to ensure all published events were consumed.

Figure 12:
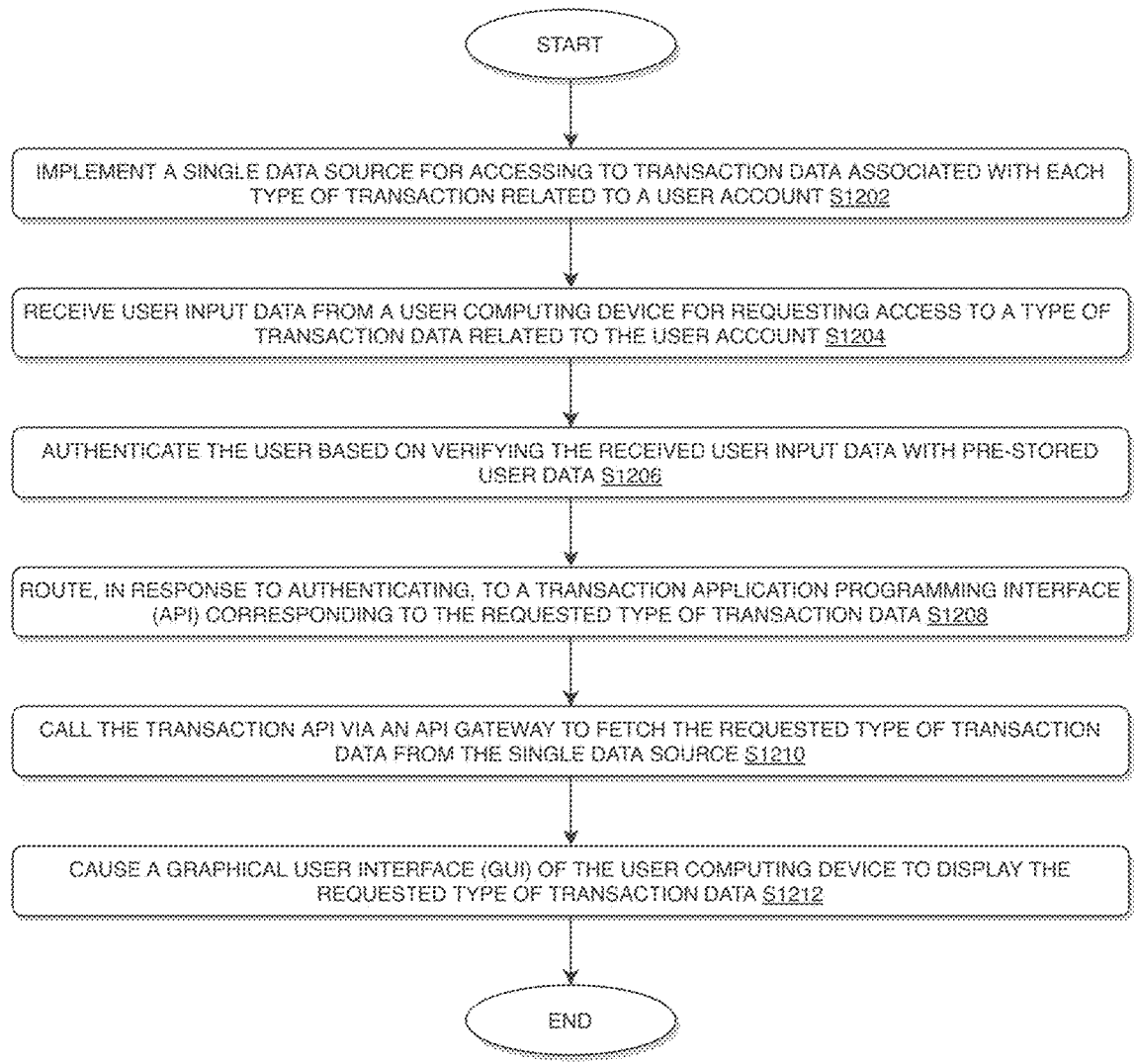
FIG. 12 illustrates a flow diagram for enhanced transaction utility in accordance with an exemplary embodiment.

FIG. 12 illustrates a flow diagram for enhanced transaction utility in accordance with an exemplary embodiment.

In the process 1200 of FIG. 12, at step S1202, a single data source may be implemented for accessing to transaction data associated with each type of transaction related to a user account.

At step 1204 of the process 1200, user input data may be received from a user computing device for requesting access to a type of transaction data related to the user account.

At step 1206 of the process 1200, the user may be authenticated based on verifying the received user input data with pre-stored user data.

At step 1208 of the process 1200, may route, in response to authenticating the user, to a transaction API corresponding to the requested type of transaction data.

At step 1210 of the process 1200, the transaction API may be called via an API gateway to fetch the requested type of transaction data from the single data source.

At step 1212 of the process 1200, the requested type of transaction data may be displayed onto the GUI 428 of the user computing device (e.g., one of the client devices 408(1)-408(n)).

According to exemplary embodiments, the process 1200 may further include: sharing the transaction API between the single data source and a system of record that stores transaction history data associated with each type of transaction related to the user account, wherein the single data source may be responsible for fulfilling "get" requests, and wherein the system of record may be responsible for fulfilling "post", or "put," or "patch," or "delete" requests, but the disclosure is not limited thereto.

According to exemplary embodiments, the process 1200 may further include: filtering the transaction data based on one or more of the following type of data: date range data, merchant data, payee data category data, and amount data, and displaying the filtered transaction data in response to received user input data associated with type of data requested.

According to exemplary embodiments, wherein, when accessing the single data source, if no response is received within a predetermined time period, the process 1200 may further include: automatically requesting again to fetch the transaction data from other system of record that stores the transaction data.

According to exemplary embodiments, the ETUD 402 may include a memory (e.g., a memory 106 as illustrated in FIG. 1) which may be a non-transitory computer readable medium that may be configured to store instructions for implementing an ETUM 406 for enhanced transaction utility. The ETUD 402 may also include a medium reader (e.g., a medium reader 112 as illustrated in FIG. 1) which may be configured to read any one or more sets of instructions, e.g., software, from any of the memories described herein. The instructions, when executed by a processor embedded within the ETUM 406 or within the ETUD 402, may be used to perform one or more of the methods and processes as described herein. In a particular embodiment, the instructions may reside completely, or at least partially, within the memory 106, the medium reader 112, and/or the processor 104 (see FIG. 1) during execution by the ETUD 402.

For example, the instructions, when executed, may cause the processor 104 to perform the following: implementing a single data source for accessing to transaction data associated with each type of transaction related to a user account; receiving user input data from a user computing device for requesting access to a type of transaction data related to the user account; authenticating the user based on verifying the received user input data with pre-stored user data, routing, in response to authenticating, to a transaction application programming interface (API) corresponding to the requested type of transaction data calling the transaction API via an API gateway to fetch the requested type of transaction data from the single data source; and causing a graphical user interface (GUI) of the user computing device to display the requested type of transaction data.

According to exemplary embodiments, the instructions, when executed, may cause the processor 104 to perform the following: sharing the transaction API between the single data source and a system of record that stores transaction history data associated with each type of transaction related to the user account, wherein the single data source may be responsible for fulfilling "get" requests, and wherein the system of record may be responsible for fulfilling "post", or "put," or "patch," or "delete" requests, but the disclosure is not limited thereto.

According to exemplary embodiments, the instructions, when executed, may cause the processor 104 to perform the following: filtering the transaction data based on one or more of the following type of data: date range data, merchant data, payee data, category data, and amount data, and displaying the filtered transaction data in response to received user input data associated with type of data requested.

According to exemplary embodiments, wherein, when accessing the single data source, if no response is received within a predetermined time period, the instructions, when executed, may cause the processor 104 to perform the following: automatically requesting again to fetch the transaction data from other system of record that stores the transaction data.

According to exemplary embodiments as disclosed above in FIGS. 1-12, technical improvements effected by the instant disclosure may include platforms for implementing an enhanced transaction utility module that provides one platform (e.g., a single point or a single data source) for all transaction related informational data, thereby isolating the complexity of fetching transaction data from different sources and ensuring that transaction data are fetched by client applications in a secure, performant, and resilient way from the single point or the singe data source, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely tor convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for enhanced transaction utility by utilizing one or more processors and one or more memories, the method comprising:
    implementing a single data source for accessing to transaction data associated with each type of transaction related to a user account;
    receiving user input data from a user computing device for requesting access to a type of transaction data related to the user account;
    authenticating the user based on verifying the received user input data with pre-stored user data;
    routing, in response to authenticating, to a transaction application programming interface (API) corresponding to the requested type of transaction data;
    calling the transaction API via an API gateway to fetch the requested type of transaction data from the single data source; and
    causing a graphical user interface (GUI) of the user computing device to display the requested type of transaction data.

2. The method according to claim 1, further comprising:
    sharing the transaction API between the single data source and a system of record that stores transaction history data associated with each type of transaction related to the user account, wherein the single data source is responsible for fulfilling "get" requests, and wherein the system of record is responsible for fulfilling "post", or "put," or "patch," or "delete" requests.

3. The method according to claim 1, wherein the single data source is a system of record for transaction level data for assisted and unassisted servicing ensuring that the user gets a consistent view of the transaction data from a single source.

4. The method according to claim 1, wherein the single data source is configured to make the transaction data available for read access via a set of small, independently versioned, and scalable services with specific business goals.

5. The method according to claim 1, wherein the single data source is configured to store a complete set of commonly used fields for each type of transaction, transaction data enrichment, and supplementary data.

6. The method according to claim 5, wherein the transaction data enrichment includes one or more of the following data: cleansed counterparty name data, cleansed category data, deduced recurring indicator data, and card on file indicator data.

7. The method according to claim 5, wherein the supplementary data includes one or more of the following data to identify a transaction: automated clearing house (ACH) payee information data and real-time payment (RTP) payee information data.

8. The method according to claim 1, further comprising:
filtering the transaction data based on one or more of the following type of data: date range data, merchant data, payee data, category data, and amount data; and
displaying the filtered transaction data in response to received user input data associated with type of data requested.

9. The method according to claim 1, wherein, when accessing the single data source, if no response is received within a predetermined time period, the method further comprising:
automatically requesting again to fetch the transaction data from other system of record that stores the transaction data.

10. A system for enhanced transaction utility, the system comprising:
a processor; and
one or memories operatively connected to the processor via a communication network, wherein the processor is configured to:
implement a single data source for accessing to transaction data associated with each type of transaction related to a user account;
cause a receiver to receive user input data from a user computing device for requesting access to a type of transaction data related to the user account from the single data source;
authenticate the user based on verifying the received user input data with pre-stored user data;
route, in response to authenticating, to a transaction application programming interface (API) corresponding to the requested type of transaction data;
call the transaction API via an API gateway to fetch the requested type of transaction data from the single data source; and
cause a graphical user interface (GUI) of the user computing device to display the requested type of transaction data.

11. The system according to claim 10, wherein the processor is further configured to:
share the transaction API between the single data source and a system of record that stores transaction history data associated with each type of transaction related to the user account, wherein the single data source is responsible for fulfilling "get" requests, and wherein the system of record is responsible for fulfilling "post", or "put," or "patch," or "delete" requests.

12. The system according to claim 10, wherein the single data source is a system of record for transaction level data for assisted and unassisted servicing ensuring that the user gets a consistent view of the transaction data from a single source.

13. The system according to claim 10, wherein the single data source is configured to make the transaction data available for read access via a set of small, independently versioned, and scalable services with specific business goals.

14. The system according to claim 10, wherein the single data source is configured to store a complete set of commonly used fields for each type of transaction, transaction data enrichment, and supplementary data.

15. The system according to claim 14, wherein the transaction data enrichment includes one or more of the following data: cleansed counterparty name data, cleansed category data, deduced recurring indicator data, and card on file indicator data.

16. The system according to claim 14, wherein the supplementary data includes one or more of the following data to identify a transaction: automated clearing house (ACH) payee information data and real-time payment (RTP) payee information data.

17. The system according to claim 10, wherein the processor is further configured to:
filter the transaction data based on one or more of the following type of data: date range data, merchant data, payee data, category data, and amount data; and
display the filtered transaction data in response to received user input data associated with type of data requested.

18. The system according to claim 10, wherein, when accessing the single data source, if no response is received within a predetermined time period, the processor is further configured to:
automatically request again to fetch the transaction data from other system of record that stores the transaction data.

19. A non-transitory computer readable medium configured to store instructions for enhanced transaction utility, wherein when executed, the instructions cause a processor to:
implement a single data source for accessing to transaction data associated with each type of transaction related to a user account;
cause a receiver to receive user input data from a user computing device for requesting access to a type of transaction data related to the user account from the single data source;
authenticate the user based on verifying the received user input data with pre-stored user data;
route, in response to authenticating, to a transaction application programming interface (API) corresponding to the requested type of transaction data;
call the transaction API via an API gateway to fetch the requested type of transaction data from the single data source; and
cause a graphical user interface (GUI) of the user computing device to display the requested type of transaction data.

20. The non-transitory computer readable medium according to claim 19, wherein the instructions, when executed, further cause the processor to:
filter the transaction data based on one or more of the following type of data: date range data, merchant data, payee data, category data, and amount data; and
display the filtered transaction data in response to received user input data associated with type of data requested.

* * * * *